(12) United States Patent
Iwase

(10) Patent No.: US 9,892,451 B2
(45) Date of Patent: Feb. 13, 2018

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Kazuhisa Iwase, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 114 days.

(21) Appl. No.: 14/520,638

(22) Filed: Oct. 22, 2014

(65) Prior Publication Data

US 2015/0286826 A1    Oct. 8, 2015

(30) Foreign Application Priority Data

Apr. 2, 2014   (JP) .................. 2014-076334

(51) Int. Cl.
```
G06F 21/00      (2013.01)
G06Q 30/06      (2012.01)
G06F 17/30      (2006.01)
G06F 21/62      (2013.01)
G06F 17/50      (2006.01)
H04L 29/06      (2006.01)
```
(52) U.S. Cl.
CPC ... *G06Q 30/0633* (2013.01); *G06F 17/30569* (2013.01); *G06F 21/6245* (2013.01); *H04L 63/102* (2013.01); *G06F 17/50* (2013.01); *H04L 63/083* (2013.01)

(58) Field of Classification Search
CPC .............. G06F 21/60; G06F 17/30569; G06F 21/6245; G06F 17/50; H04L 67/10; H04L 63/102; H04L 63/083; G06Q 30/0633
See application file for complete search history.

(56) References Cited

U.S. PATENT DOCUMENTS 6,144,955 A  *  11/2000  Tsuiki ............... G06Q 10/0633
                                                          705/7.27
8,069,074 B2 *  11/2011  Toyofuku ............. G06Q 10/06
                                                             700/97

FOREIGN PATENT DOCUMENTS

JP       2008077141    *  3/2008
JP       A-2008-077141    4/2008

* cited by examiner

*Primary Examiner* — Kendall Dolly
(74) *Attorney, Agent, or Firm* — Oliff PLC

(57) ABSTRACT

An information processing apparatus includes a determination unit, a conversion unit, and a transmission unit. The determination unit determines information not to be transmitted in a step, which is managed according to a flow definition and is related to design information, if the step is a predetermined step. The conversion unit converts the design information by deleting the information determined by the determination unit from the design information or by converting the information determined by the determination unit into other information. The transmission unit transmits the converted design information to an external destination.

8 Claims, 9 Drawing Sheets

500

| ~510 | ~520 | ~530 | ~540 | ~550 |
|---|---|---|---|---|
| ACTION | SHAPE DATA | PROCESSING INFORMATION | PRODUCT INFORMATION | BOUNDARY INFORMATION |
| ESTIMATE | O | O | X | X |
| ORDER | O | O | O | O |
|  |  |  |  |  |

| Registration screen |
|---|
| 410 — Drawing file:    C:\data.cad |
| 420 — Configuration information file:    C:\config.xls |
| 430 — Registered attribute |
| 440 — Part name: ☑ |
| 450 — Material information (material): ☑ |
| 460 — Center of gravity information (gravity): ☑ |
| 470 — Volume information (volume): ☑ |

| ~510 | ~520 | ~530 | ~540 | ~550 |
|---|---|---|---|---|
| ACTION | SHAPE DATA | PROCESSING INFORMATION | PRODUCT INFORMATION | BOUNDARY INFORMATION |
| ESTIMATE | ○ | ○ | × | × |
| ORDER | ○ | ○ | ○ | ○ |
|  |  |  |  |  |

700

| CLIENT NAME | PERSON IN CHARGE | MAIL ADDRESS | TELEPHONE NUMBER | LOCATION | NUMBER OF TRANSACTIONS | EVALUATION | ACCESS PASSWORD |
|---|---|---|---|---|---|---|---|
| CLIENT A | MR. XX | XX@a.co.jp | 212-XXX-XXXX | ZZZ, NEW YORK CITY | 2 | A | xxxxx |
| CLIENT B | MRS. YY | YY@b.co.jp | 312-XXX-XXXX | ZZZ, CHICAGO, ILLINOIS STATE | 0 | – | yyyyy |

710 720 730 740 750 760 770 780

800

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-076334 filed Apr. 2, 2014.

BACKGROUND

Technical Field

The present invention relates to an information processing apparatus, an information processing method, and a non-transitory computer readable medium.

SUMMARY

According to an aspect of the invention, there is provided an information processing apparatus including a determination unit, a conversion unit, and a transmission unit. The determination unit determines information not to be transmitted in a step, which is managed according to a flow definition and is related to design information, if the step is a predetermined step. The conversion unit converts the design information by deleting the information determined by the determination unit from the design information or by converting the information determined by the determination unit into other information. The transmission unit transmits the converted design information to an external destination.

BRIEF DESCRIPTION OF THE DRAWINGS

Exemplary embodiments of the present invention will be described in detail based on the following figures, wherein:

FIG. 4 illustrates an exemplary registration screen;

FIG. 5 illustrates an exemplary data structure of a confidential information delivery matrix;

DETAILED DESCRIPTION

Exemplary embodiments of the present invention will herein be described with reference to the attached drawings.

Figure 1:
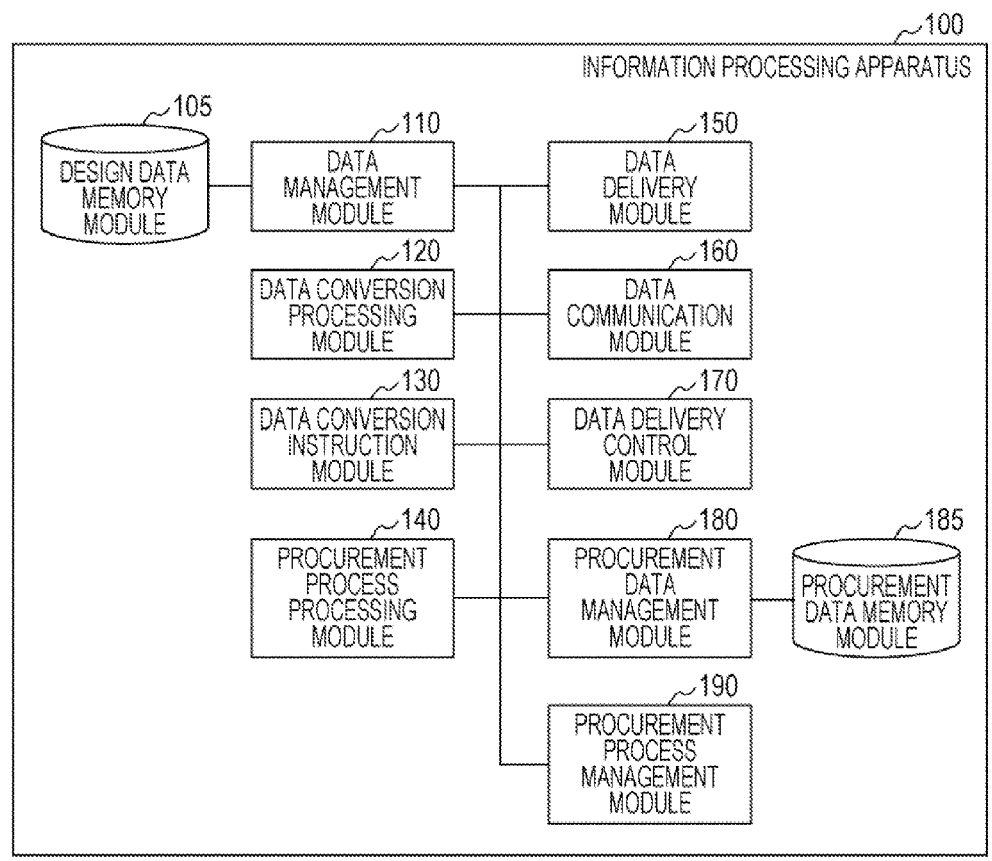
FIG. 1 illustrates an exemplary conceptual module configuration of an information processing apparatus according to an exemplary embodiment.

FIG. 1 illustrates an exemplary conceptual module configuration of an information processing apparatus according to an exemplary embodiment.

The modules generally mean parts including software (computer program) and hardware, which are capable of being logically separated. Accordingly, the modules in the exemplary embodiments mean not only the modules in the computer program but also the modules in the hardware configuration. The computer program causing the computer to function as the modules (a program causing the computer to execute the respective procedures, a program causing the computer to function as the respective units, or a program causing the computer to realize the respective functions), a system, and a method are described in the exemplary embodiments. Although "store", "causing the computer to store", and similar phrases are used for convenience, these phrases mean storing the computer program in a memory or causing the computer to store the computer program in the memory when the computer program is embodied. Although the module may have one-to-one correspondence with the function, one module may be composed of one program, multiple modules may be composed of one program, or one module may be composed of multiple programs in installation. The multiple modules may be executed by one computer or one module may be executed by multiple computers in distributed or parallel environment. Other modules may be included in one module. "Connection" is hereinafter used not only for physical connection but also for logical connection (exchange of data, instruction, reference relationship between pieces of data, etc.). "Predetermined" means that something is determined before a target process and includes, in addition to determination before the process according to an exemplary embodiment is started, determination based on the current status or state or the past status or state before the target process even if the process according to the exemplary embodiment is started. When multiple "predetermined values" exist, the predetermined values may be different from each other or two or more (including all) of the multiple predetermined values may be equal to each other. A description meaning that "B is performed if A" is used to mean that "it is determined whether A and, if it is determined that A, B is performed." However, cases in which the determination of whether A is not necessary are excluded.

A system or an apparatus may be realized by one computer, one piece of hardware, one unit, or the like, in addition to a configuration in which multiple computers, multiple pieces of hardware, multiple units, and the likes are connected to each other via a communication unit, such as a network (including one-to-one correspondence communication connection). The "apparatus" and the "system" are used as synonyms. The "system" does not include a social "mechanism" (social system), which is artificial agreement.

When multiple processes are performed for every process in each module or in the module, target information is read out from the memory for each process, the process is performed, and the result of the process is written out onto the memory. Accordingly, a description of the reading from the memory before the process and writing out onto the memory after the process may be omitted. The memory may be a hard disk, a random access memory (RAM), an external storage medium, a memory via a communication line, a register in a central processing unit (CPU), or the like.

An information processing apparatus 100 according to the present exemplary embodiment manages steps according to a flow definition. Referring to FIG. 1, the information processing apparatus 100 includes a design data memory module 105, a data management module 110, a data conversion processing module 120, a data conversion instruction module 130, a procurement process processing module 140, a data delivery module 150, a data communication module 160, a data delivery control module 170, a procurement data management module 180, a procurement data memory module 185, and a procurement process management module 190. The information processing apparatus 100 transmits drawing information which is three-dimensional data, for example, when the information processing apparatus 100 requests an estimate from the outside or places an order with the outside in accordance with a workflow process. In particular, the information processing apparatus 100 is applicable to an ordering system embodying an ordering process. The ordering process generally includes a series of steps including rough estimate, detailed estimate, and formal order, and it is necessary to transmit design information (hereinafter also referred to as design data) including confidential information corresponding to each step to an order destination in the step. For example, only shape data is required in the rough estimate, annotation information concerning product processing is required in the detailed estimate, and boundary information is required in the formal order. At the same time, it is necessary to prevent leakage of highly-confidential know-how. The "confidential information" means information concerning design know-how in the information included in the design data and the information other than the shape data may correspond to the confidential information. Typically, parameters, arithmetic expressions of the parameters, logics (macros), feature histories (work procedures), and so on are included in the confidential information. In the workflow process, the flow of an operation (an operation at least including a process of transmitting the design information to the outside here) concerning the design information is reproduced on an electronic system to allow the flow of the business to be executed with an electronic unit (using a program).

An exemplary process performed by the information processing apparatus 100 will now be roughly described. The description here is intended to make the understanding of the present exemplary embodiment easy.

In order to conceal the confidential information corresponding to each step to reduce the risk of the leakage of the information, the confidential information to be transmitted is defined for each step in the ordering process and, in the transmission of the design data, only the confidential information defined for each step is included in the design data (that is, unnecessary confidential information is deleted from the original design data or is modified) for delivery.

In each of the steps including the rough estimate, the detailed estimate, and the formal order in the ordering process, a list of the pieces of confidential information to be transmitted is defined in advance. In the transmission in each step of the ordering process, the list of the pieces of confidential information defined for each step is compared with the confidential information included in the design data that is input as data to be delivered. If the confidential information that should not be transmitted exists in the design data, the design data resulting from deletion or modification of the confidential information that should not be transmitted is created and the created design data is transmitted.

The data management module 110, the data conversion processing module 120, the data conversion instruction module 130, the procurement process processing module 140, the data delivery module 150, the data communication module 160, the data delivery control module 170, the procurement data management module 180, and the procurement process management module 190 are connected to each other.

The design data memory module 105 is connected to the data management module 110. The design data memory module 105 stores the design data. For example, the design data memory module 105 stores data about a three-dimensional (3D) model or the like created in response to an operation by a designer using a three-dimensional computer aided design (3DCAD).

The data management module 110 registers and stores the design data about the created 3D model or the like to provide a search and reference function.

The data conversion processing module 120 reads and converts the design data in response to a conversion instruction from the data conversion instruction module 130 and returns the result of the processing to the data conversion instruction module 130. Specifically, the data conversion processing module 120 deletes information determined by the procurement process processing module 140 from the design data to convert the design data. The data conversion processing module 120 may convert the information determined by the procurement process processing module 140 into other information, instead of the deletion of the information. The "other information" may be, for example, inaccurate information as long as the information is not included in the original design data. The inaccurate information may be, for example, a random number or a value resulting from multiplication or the like of the original information by a random number. Processing in which the "deletion of the information" is combined with the "conversion into the other information" may be performed. Specifically, the data conversion processing module 120 may delete part of the information determined by the procurement process processing module 140 to convert the information in the remaining portion.

The data conversion instruction module 130 acquires the design data stored in the design data memory module 105 and instructs the data conversion processing module 120 to convert the acquired design data and the design data to be converted to manage the conversion processing.

The procurement process processing module 140 performs the processing in each step according to the flow definition related to the design data. When the step according to the flow definition is a predetermined step, the procurement process processing module 140 determines information that should not be transmitted in the step. Specifically, the procurement process processing module 140 may extract the information that corresponds to the target step and that should not be transmitted from a confidential information distribution matrix 500 in which each step is associated with the information that should not be transmitted to determine the information that should not be transmitted. More specifically, the procurement process processing module 140 may identify the confidential information to be deleted or modified from step information according to the confidential information delivery matrix 500 and instructs the data conversion instruction module 130 to convert the confidential information and the information about the data to be delivered. After the conversion, the procurement process processing module 140 instructs the data delivery module 150 to deliver the data.

The data delivery module 150 delivers the data to a delivery destination in response to a data delivery instruction from the data delivery control module 170. The data delivery process has a transmission function with an electronic mail and an upload function to an online storage (file server).

The data communication module 160 controls data communication with an external apparatus. The data communication module 160 transmits the design data, which is the result of the conversion in the data conversion processing module 120, to an external destination. Multiple external destinations may exist to which the data communication module 160 transmits the design data and the same information may be transmitted for every external destination. The external destination to which the design data is transmitted may be a memory accessible by a person who receives the design data. For example, the design data may be transmitted to the external destination with the electronic mail or may be stored in, for example, the online storage provided through a cloud service.

The data delivery control module 170 identifies a data deliver destination to control the delivery process. The data delivery control module 170 instructs the data delivery module 150 to deliver the data.

The procurement data management module 180 manages the confidential information delivery matrix 500 in which procurement destination (delivery destination) information and the confidential information to be deleted or modified are defined for each step.

The procurement data memory module 185 is connected to the procurement data management module 180. The procurement data memory module 185 stores the confidential information delivery matrix 500. In the confidential information delivery matrix 500, the shape data (facet data), which is used to represent the appearance of a 3D model, processing information about the product, product information indicating the component structure or the like, the annotation information in which dimensions and so on are described, the boundary information (also referred to as b-rep information), which is one technique to represent the shape of the 3D model, and so on are capable of being selectively defined as the information that should not be transmitted. Specifically, the annotation information is, for example, product and manufacturing information (PMI) or geometric dimensioning and tolerancing (GD&T). The confidential information delivery matrix 500 is a matrix to manage the information that is defined for each step in the flow definition and that is capable of being delivered. FIG. 5 illustrates an exemplary data structure of the confidential information delivery matrix 500. Referring to FIG. 5, the confidential information delivery matrix 500 includes an action field 510, a shape data field 520, a processing information field 530, a product information field 540, and a boundary information field 550. The action field 510 stores actions (steps) in the flow definition. The shape data field 520 stores information (a flag) indicating whether the shape data is data that should be transmitted in each action. In the shape data field 520, a circle indicates that the information may be transmitted and a cross indicates that the information should not be transmitted. The processing information field 530 stores information indicating whether the processing information is data that should be transmitted in the action. The product information field 540 stores information indicating whether the product information is data that should be transmitted in the action. The boundary information field 550 stores information indicating whether the boundary information is data that should be transmitted in the action. The amount of the information that should not be transmitted in the "action: Estimate" is more than that in the "action: Order" in order to reduce the risk of the leakage of the information and only the information necessary for the estimate is specified in the "action: Estimate." The number of destinations to which information is transmitted in the "action: Oder" is generally smaller than that in the "action: Estimate."

The procurement process management module 190 manages the process (steps) and the state of the process (steps) in a procurement operation. The procurement process management module 190 performs the so-called workflow process.

Figure 2:
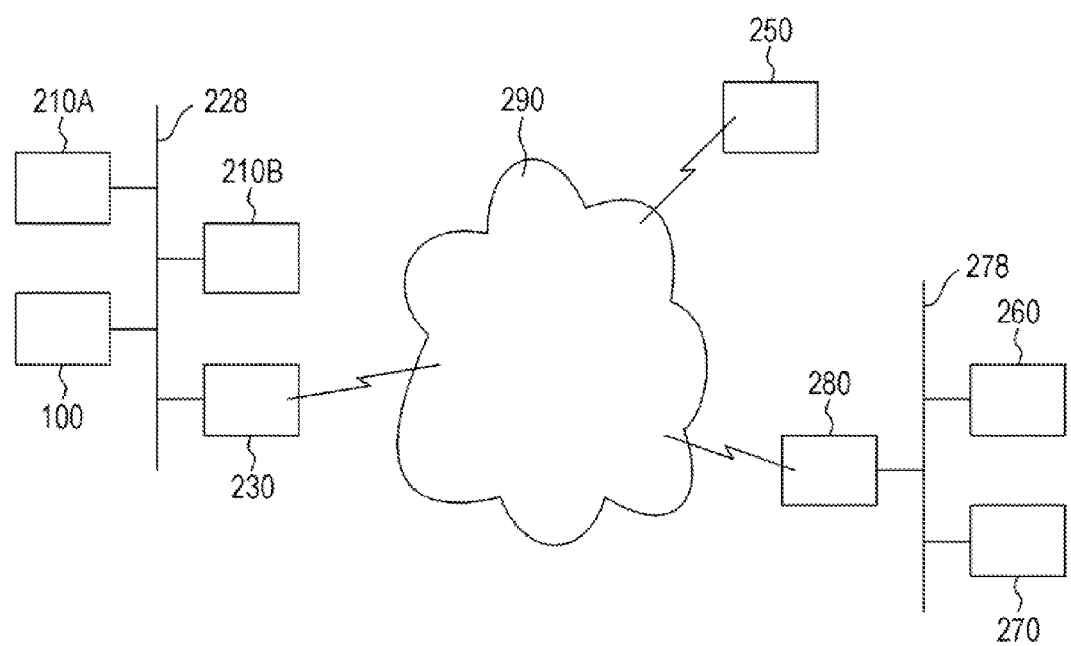
FIG. 2 illustrates an exemplary system configuration to which the present exemplary embodiment is applied.

FIG. 2 illustrates an exemplary system configuration to which the present exemplary embodiment is applied.

Referring to FIG. 2, each of a communication line 228, a communication line 278, and a communication line 290 is a wireless communication line, a wired communication line, or a combination of them. For example, in a company A, the information processing apparatus 100, a CAD apparatus 210A, a CAD apparatus 210B, and a communication processing apparatus 230 are connected to each other via the communication line 228. In a company B, a CAD apparatus 260, a procurement processing apparatus 270, and a communication processing apparatus 280 are connected to each other via the communication line 278. The communication line 228 and the communication line 278 are, for example, intranets serving as communication infrastructures provided in the companies A and B, respectively. The communication processing apparatus 230 and the communication processing apparatus 280 each communicate with an external communication line and each have a firewall function or the like. It is assumed here that the estimate and the order are placed from the company A to the company B. The communication processing apparatus 230, a data delivery server 250, and the communication processing apparatus 280 are connected to each other via the communication line 290. The communication line 290 is, for example, the Internet serving as the communication infrastructure. For example, multiple CAD apparatuses 210 (the CAD apparatus 210A and the CAD apparatus 210B are collectively referred to as a CAD apparatus 210) may be provided in the company A and multiple CAD apparatuses 260 may be provided in the company B. Multiple companies that receive the orders may exist. The data delivery server 250 is an online storage provided through the cloud service and may be managed by the company A or another company.

The design data about, for example, the 3D model created with the CAD apparatus 210A or the like is converted in accordance with the step in the workflow by the information processing apparatus 100 and is stored in the data delivery server 250. The procurement processing apparatus 270 in the company B extracts the design data from the data delivery server 250 to perform, for example, the estimate.

Figure 3:
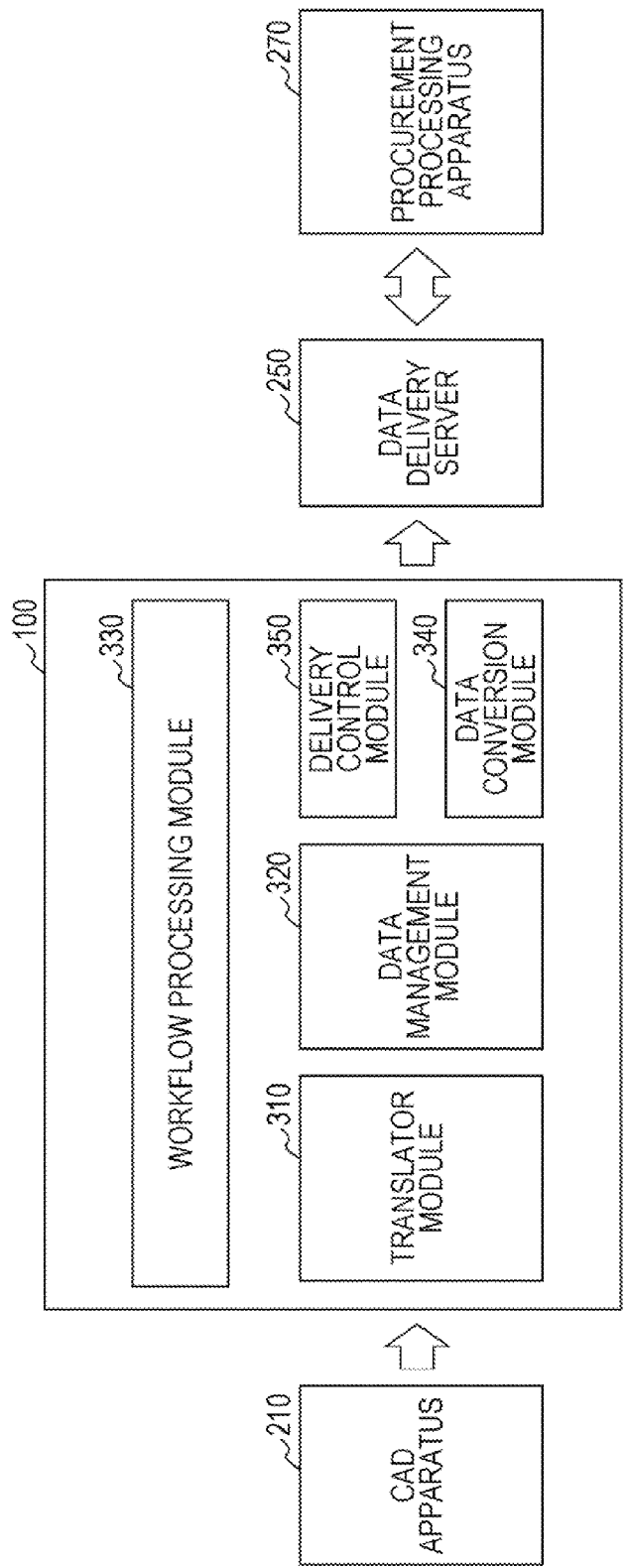
FIG. 3 illustrates an exemplary conceptual module configuration in another aspect of the information processing apparatus according to the present exemplary embodiment.

FIG. 3 illustrates an exemplary conceptual module configuration in another aspect of the information processing apparatus according to the present exemplary embodiment.

Referring to FIG. 3, the information processing apparatus 100 includes a translator module 310, a data management module 320, a workflow processing module 330, a data conversion module 340, and a delivery control module 350. The information processing apparatus 100 receives the design data from the CAD apparatus 210 and transmits the design data for each step to the procurement processing apparatus 270 via the data delivery server 250.

The CAD apparatus 210 creates the design data including the shape data, the processing information, the product information, and so on about the 3D model in response to an operation by the designer.

The translator module 310 performs standardization and leveling of the data based on the 3D model and extraction of attributes. The translator module 310 performs registration in the data management module 320 described below.

The data management module 320 includes the data management module 110 and the design data memory module 105 illustrated in FIG. 1. The data management module 320 provides a registration function, an update function, a reference function, and a deletion function of the 3D model data and the attribute information to manage the data.

The workflow processing module 330 includes the data conversion instruction module 130, the procurement process processing module 140, the procurement data management module 180, the procurement data memory module 185, and the procurement process management module 190 illustrated in FIG. 1. The workflow processing module 330 controls a procurement process. For example, the workflow processing module 330 manages the steps of estimate request, order, design change, cost reduction request, and so on. The workflow processing module 330 may provide, for example, the registration function, the update function, the reference function, and the deletion function of information about the procurement destination.

The data conversion module 340 includes the data conversion processing module 120 illustrated in FIG. 1. The data conversion module 340 converts the design data in the delivery of the data. Specifically, for example, the data conversion module 340 may perform format conversion, in addition to the data deletion and the data conversion.

The delivery control module 350 includes the data delivery module 150, the data communication module 160, and the data delivery control module 170 illustrated in FIG. 1. The delivery control module 350 transmits the design data converted by the data conversion module 340 to the procurement processing apparatus 270, which is a client, via the data delivery server 250.

The data delivery server 250 provides the online storage function to deliver the data to the outside (for example, the procurement processing apparatus 270, which is a client).

The procurement processing apparatus 270, which is the delivery destination (client), accesses the data delivery server 250 to acquire delivery data that is registered (the design data).

Upon reception of an instruction to design the product, the designer performs the creation of the design information with the CAD apparatus 210. The design data including the confidential information, such as the shape data about the 3D model and the processing information, which includes design know-how is created with a 3D-CAD system or the like here. The 3D CAD system in the CAD apparatus 210 may not be a specific CAD product.

The created design data is temporarily stored in a product data management (PDM) system configured as a local disk or a CAD system.

The created design data is registered in the data management module 320 via the translator module 310 on the basis of an instruction on a registration menu displayed by the data management module 320. FIG. 4 illustrates an example of a registration screen 400. Referring to FIG. 4, the registration screen 400 includes a drawing file field 410, a configuration information file field 420, and a registered attribute field 430. The registered attribute field 430 includes a part name field 440, a material information field 450, a center of gravity information field 460, and a volume information field 470. On the registration screen 400, a drawing file, which is the design data, is specified with the drawing file field 410, a reference path to the configuration information file is specified with the configuration information file field 420, and each attribute to be registered as a search attribute in the data management module 320 is specified with the registered attribute field 430. In the registered attribute field 430, for example, specification with the part name field 440 (may be a part number), the material information field 450, the center of gravity information field 460, and the volume information field 470 is available.

In the registration of the design data, the translator module 310 converts arbitrary CAD data into a standard format (for example, a JT-Open format standardized in International Organization for Standardization (ISO) or a STEP format) and registers the CAD data resulting from the conversion in the data management module 320 as registration CAD data. The translator module 310 extracts the attribute specified on the registration screen 400 from the CAD data to set the extracted attribute as the attribute used to search for the CAD data that is registered in advance. If the specified attribute does not exist in the CAD data, the translator module 310 registers NULL (=no value).

Other group members in the design group to which the designer belongs perform design review (DR) using the search and acquisition function of the data management module 320. If the design data is improper, the other group members revise the data using the deletion and update function of the data management module 320 for consolidated management of the design data.

In the workflow processing module 330, the confidential information delivery matrix 500 defining the confidential information (confidential information items) the transmission of which to the outside is permitted is defined in advance and is stored in the procurement data memory module 185. As described above, an example of the confidential information delivery matrix 500 is illustrated in FIG. 5. In the example in FIG. 5, a circle and a cross indicate permission of the transmission of the confidential information item and non-permission of the transmission of the confidential information item, respectively.

Figure 6:
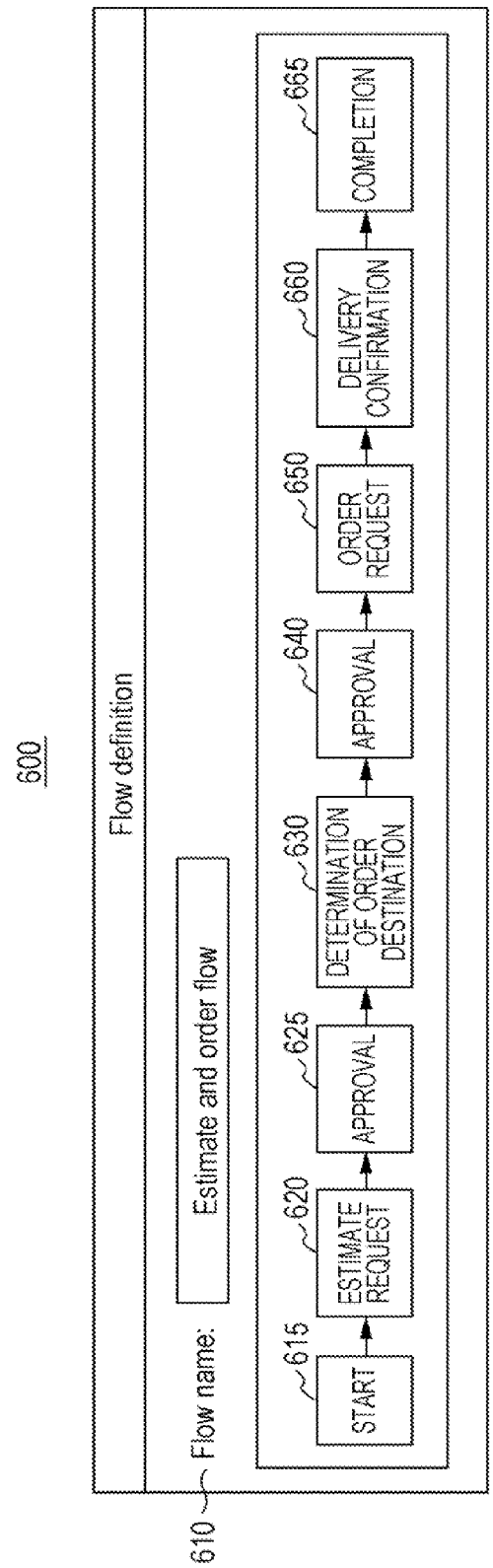
FIG. 6 illustrates an exemplary flow definition screen.

The workflow processing module 330 defines a procurement flow process on the basis of an operation by an operator (the definition using a flow definition screen 600 described below), defines programs to execute an "estimate action" and an "order action" described below for an "estimate request 620" and an "order request 650", respectively, which are the steps in the procurement flow process, and stores the defined programs in the procurement data memory module 185. These execution programs are arranged in the information processing apparatus 100 so as to be started from the workflow processing module 330. FIG. 6 illustrates an example of the flow definition screen 600. Referring to FIG. 6, a flow name field 610 is displayed on the flow definition screen 600. Start 615, estimate request 620, approval 625, determination of order destination 630, approval 640, order request 650, delivery confirmation 660, and completion 665 are sequentially displayed as the steps defined in the flow in the flow name field 610. A process of transmitting the design data to the outside is defined for the estimate request 620 and the order request 650 in the above steps.

Figures 7, 8:
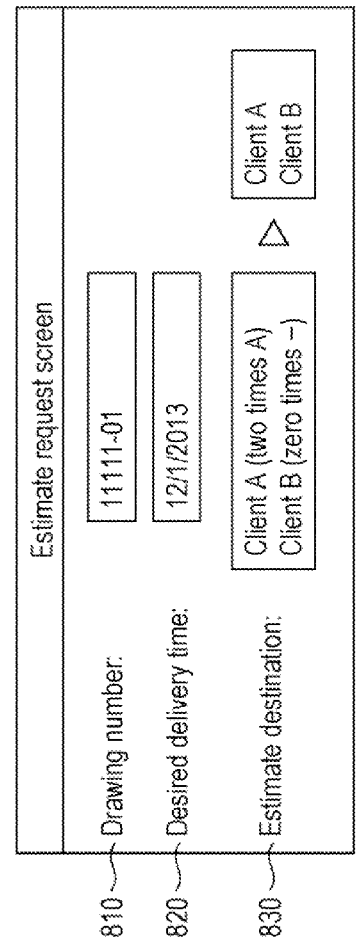
FIG. 7 illustrates an exemplary data structure of a procurement destination candidate table.
FIG. 8 illustrates an exemplary estimate request screen.

Multiple procurement destination candidates are stored in advance in the procurement data memory module 185, along with access password information defined for each procurement destination name, each person in charge, each contact name, and each client. The procurement destination candidates may be registered each time an increase or decrease in the procurement destination candidates occurs. FIG. 7 illustrates an exemplary data structure of a procurement destination candidate table 700. Referring to FIG. 7, the procurement destination candidate table 700 includes a client name field 710, a person in charge field 720, a mail address field 730, a telephone number field 740, a location field 750, a number of transactions field 760, an evaluation field 770, and an access password field 780. The client name field 710 stores client names. The person in charge field 720 stores the person in charge in each client. The mail address field 730 stores the electronic mail address of the person in charge. The telephone number field 740 stores the telephone number of the person in charge. The location field 750 stores the location of the client. The number of transactions field 760 stores the number of transactions with the client. The evaluation field 770 stores the evaluation value of the client. The access password field 780 stores an access password used by the client to access the design data.

The procurement operation is started upon start of an "estimate and order flow" registered on the flow definition screen 600.

FIG. 8 illustrates an example of an estimate request screen 800 in the estimate step. Referring to FIG. 8, the estimate request screen 800 includes a drawing number field 810, a desired delivery time field 820, and an estimate destination field 830. In the example of the estimate request screen 800 in FIG. 8, a drawing number is specified in the drawing number field 810, a desired delivery time is specified in the desired delivery time field 820, and one or multiple "estimate destinations" are specified in the estimate destination field 830 to perform "one company limited quote" or "competitive quotes."

In the program to execute the "estimate action", a) the design data to be estimated, which is specified with the drawing number from the data management module 320, b) the estimate destination information specified as the procurement destination from the procurement destination candidate table 700 stored in the procurement data memory module 185, and c) a list of the pieces of confidential information that is capable of being delivered in the "estimate" step from the confidential information delivery matrix 500 stored in the procurement data memory module 185 are acquired and the list of the pieces of confidential information in c) and the design data in a) are transmitted to the data conversion module 340.

The data conversion module 340 reads the design data and deletes (or converts) information defined as the information that should be transmitted in the confidential information delivery matrix 500 to recreate the design data.

The recreated design data is uploaded to the data delivery server 250 for each procurement destination. A reference access right (the access password field 780 in the procurement destination candidate table 700) allowing only the person in charge in one or multiple procurement destinations to refer to the stored data is added to the stored data here.

Upon completion of the storage of the data, the electronic mail (the mail address field 730 in the procurement destination candidate table 700) that includes an access Uniform Resource Locator (URL) to the stored data and that indicates that the estimate request is to be performed is transmitted to the person in charge in the procurement destination. In response to an operation by the person in charge in the procurement destination who receives the electronic mail, the procurement processing apparatus 270 accesses the data delivery server 250 and acquires the design data after authentication with the access password that is registered in advance (the access password field 780 in the procurement destination candidate table 700) to start the estimate operation.

In the estimate operation by the procurement processing apparatus 270 in the procurement destination, for example, if only the shape data is included, the process using detailed design information, for example, the estimate through simulation is not performed in order to reduce the leakage of the design information and the know-how.

Upon completion of the estimate operation in the procurement destination, a quotation is transmitted to the order destination using the electronic mail or a facsimile along with the estimated amount.

Upon acquisition of the quotation, in the case of the competitive quotes, the order destination is determined and, then, the estimate action is terminated.

Upon termination of the estimate action, the access right to the design data stored in the data delivery server 250 is deleted to suppress subsequent unnecessary access. The design data itself may be deleted from the data delivery server 250.

In a subsequent "order" flow, the procurement destination determined in the "estimate and order" flow, a part number to be ordered, and delivery time information are input to instruct start of the program to execute the "order action."

In the program to execute the "order action", a), b), and c) in the "estimate action" described above are performed using the confidential information in the "order" action in the confidential information delivery matrix 500 to submit the order request to the order destination.

Figure 9:
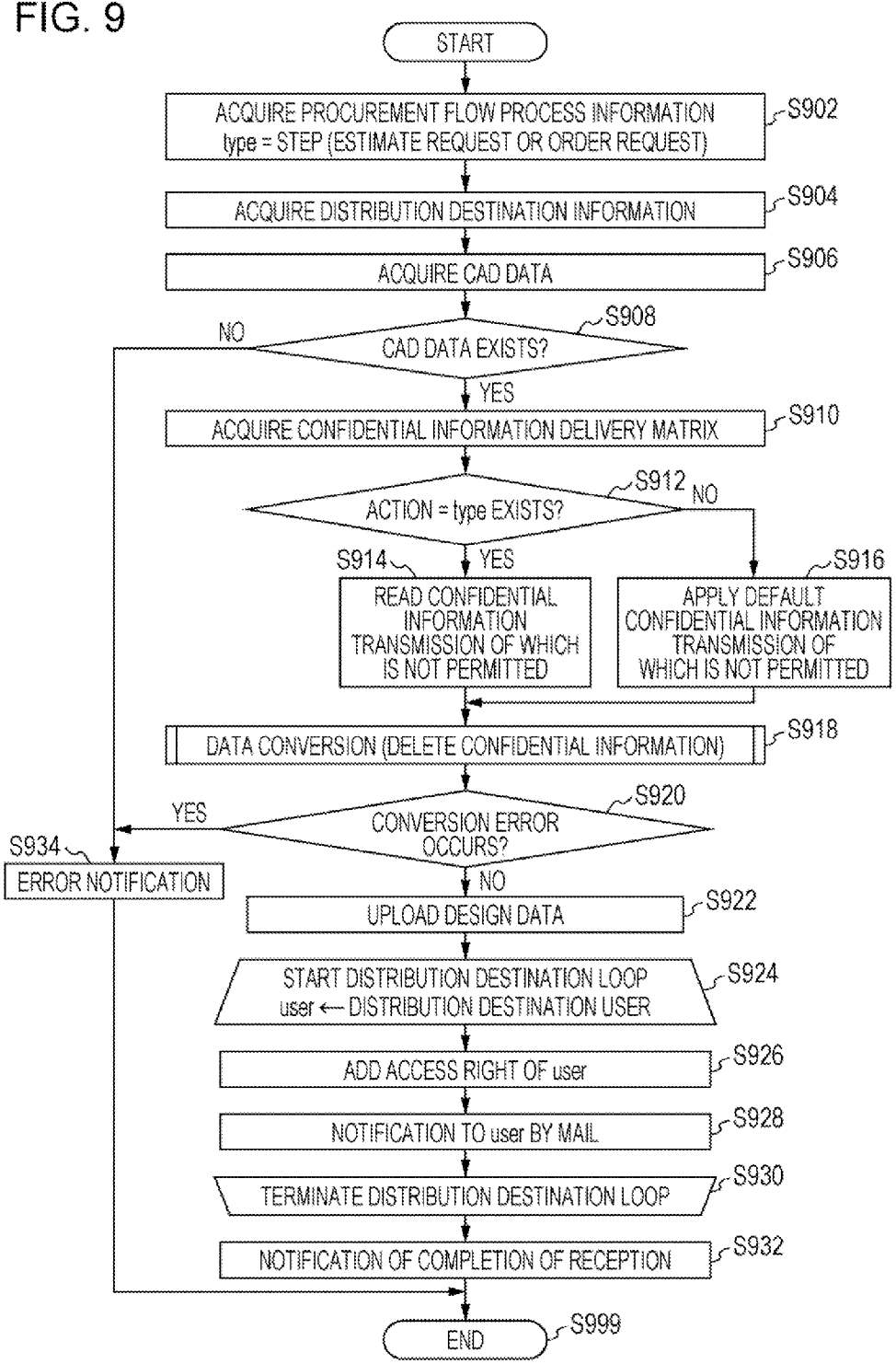
FIG. 9 is a flowchart illustrating an exemplary process according to an exemplary embodiment.

FIG. 9 is a flowchart illustrating an exemplary process according to an exemplary embodiment.

Referring to FIG. 9, in Step S902, information about the procurement flow process is acquired. It is assumed here that type information indicates the step "estimate request" or the step "order request."

In Step S904, distribution destination information is acquired.

In Step S906, the CAD data, which is the design data, is acquired.

In Step S908, it is determined whether the CAD data exists. If it is determined that the CAD data does not exist (NO in Step S908), the process goes to Step S934. If it is determined that the CAD data exists (YES in Step S908), the process goes to Step S910.

In Step S910, the confidential information delivery matrix 500 is acquired.

In Step S912, it is determined whether the current action (step) exists in the action field 510 in the confidential information delivery matrix 500. If it is determined that the current action (step) exists in the action field 510 in the confidential information delivery matrix 500 (YES in Step S912), the process goes to Step S914. If it is determined that the current action (step) does not exist in the action field 510 in the confidential information delivery matrix 500 (NO in Step S912), the process goes to Step S916.

In Step S914, the confidential information the transmission of which is not permitted is read out from the confidential information delivery matrix 500.

In Step S916, default (predetermined) confidential information the transmission of which is not permitted is applied. For example, as the default confidential information the transmission of which is not permitted, the confidential information in the action having the largest amount of confidential information, among the actions in the confidential information delivery matrix 500, may be applied or the confidential information to be applied may be arbitrarily defined.

In Step S918, the data conversion is performed (the confidential information is deleted or converted). The data conversion will be described in detail below with reference to a flowchart in FIG. 10.

In Step S920, it is determined whether any conversion error occurs in Step S918. If it is determined that any conversion error occurs (YES in Step S920), the process goes to Step S934. If it is determined that no conversion error occurs (NO in Step S920), the process goes to Step S922.

In Step S922, the design data after the conversion is uploaded.

In Step S924, a distribution destination loop is started. A variable user is set as the distribution destination user in the procurement destination candidate table 700.

In Step S926, the access right of the variable user (the distribution destination user) is added.

In Step S928, notification to the variable user (the distribution destination user) using the electronic mail is performed.

In Step S930, if the processing of all the distribution destinations is completed, the distribution destination loop is terminated.

In Step S932, notification of completion of the reception is performed.

In Step S934, notification of an occurrence of the error in Step S908 or Step S920 is performed. After Step S923 and Step S334, in Step S999, the process in FIG. 9 is terminated.

Figure 10:
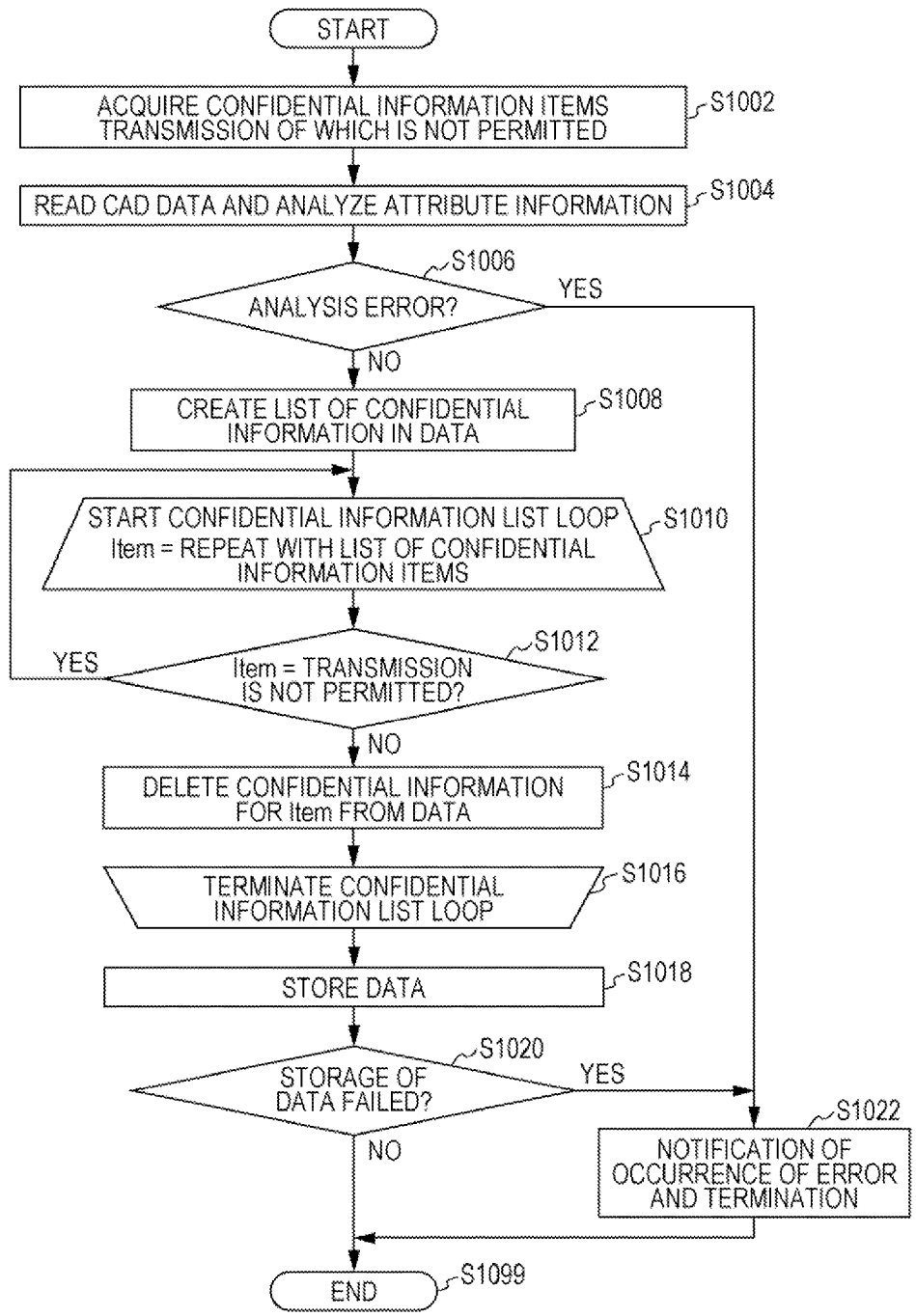
FIG. 10 is a flowchart illustrating part of the exemplary process according to the present exemplary embodiment in detail.

FIG. 10 is a flowchart illustrating an exemplary process in Step S918 in FIG. 9 according to the present exemplary embodiment in detail.

Referring to FIG. 10, in Step S1002, the confidential information items the transmission of which is not permitted in the action (step) are acquired from the confidential information delivery matrix 500.

In Step S1004, the CAD data, which is the design information, is read and the attribute information (the processing information, the product information, the boundary information, etc.) included in the CAD data is analyzed.

In Step S1006, it is determined whether any analysis error occurs. If it is determined that any analysis error occurs (YES in Step S1006), the process goes to Step S1022. If it is determined that no analysis error occurs (NO in Step S1006), the process goes to Step S1008.

In Step S1008, a list of the pieces of confidential information in the attribute information included in the CAD data is created.

In Step S1010, the confidential information list loop created in Step S1008 is started. A variable Item is repeated with the list of the confidential information items.

In Step S1012, it is determined whether the transmission of the variable Item is not permitted in the confidential information delivery matrix 500. If it is determined that the transmission of the variable Item is not permitted (NO in Step S1012), the process goes to Step S1014. If it is determined that the transmission of the variable Item is permitted (YES in Step S1012), the process goes back to Step S1010 to process the next variable Item. In other words, if the item acquired in Step S1002 coincides with the attribute information analyzed in Step S1004, the process goes to Step S1014.

In Step S1014, the confidential information for the variable Item is deleted from the CAD data or is modified.

In Step S1016, if the processing of all the confidential information items is completed, the confidential information list loop is terminated.

In Step S1018, the design data that is converted is stored.

In Step S1020, it is determined whether the storage of the converted design data failed. If it is determined that the storage of the converted design data failed (YES in Step S1020), the process goes to Step S1022. The process otherwise (NO in Step S1020) goes to Step S1099. In Step S1099, the process in FIG. 10 is terminated.

In Step S1022, notification of an occurrence of the error and termination is performed. In Step S1099, the process in FIG. 10 is terminated. In this case, the process goes to Step S934 in the flowchart illustrated in FIG. 9.

Figure 11:
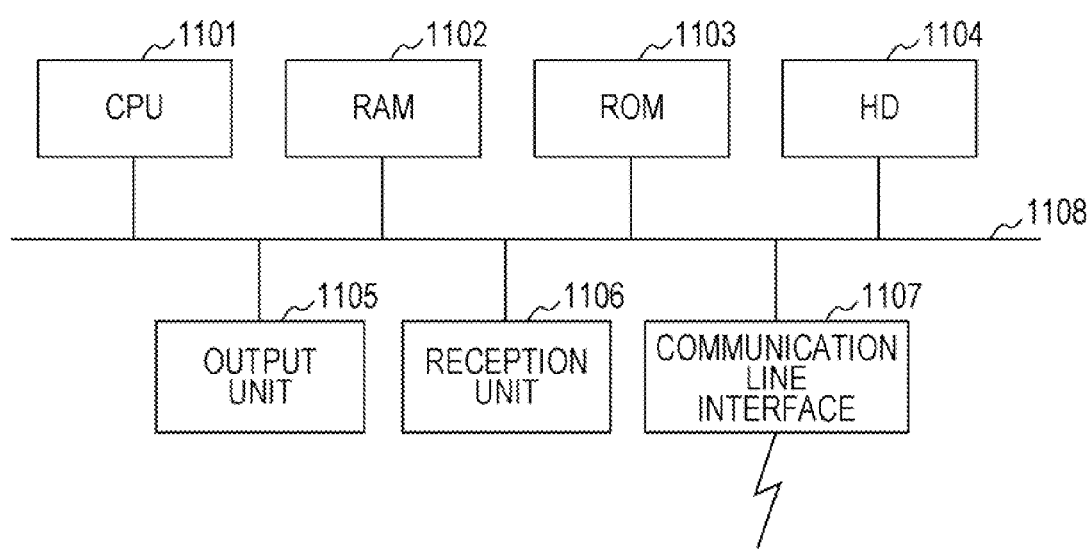
FIG. 11 is a block diagram illustrating an exemplary hardware configuration of a computer realizing the present exemplary embodiment.

A computer in which the programs according to the exemplary embodiment are executed has the hardware configuration of a general computer, as illustrated in FIG. 11. Specifically, the computer is, for example, a personal computer or a server. More specifically, the computer uses a CPU 1101 as a processor (an arithmetic unit) and uses a RAM 1102, a read only memory (ROM) 1103, and a hard disk (HD) 1104 as memories. The computer includes the CPU 1101 that executes the programs of, for example, the data management module 110, the data conversion processing module 120, the data conversion instruction module 130, the procurement process processing module 140, the data delivery module 150, the data communication module 160, the data delivery control module 170, the procurement data management module 180, the procurement process management module 190, the translator module 310, the data management module 320, the workflow processing module 330, the data conversion module 340, and the delivery control module 350; the RAM 1102 that stores the programs and data; the ROM 1103 that stores a program to boot the computer and so on; the HD 1104 that serves as an auxiliary memory (may be a flash memory); an output unit 1105, such as a cathode ray tube (CRT) or a liquid crystal display; a reception unit 1106 that receives data on the basis of an operation by the user with, for example, a keyboard, a mouse, or a touch panel; a communication line interface 1107 to connect to a communication network, such as a network interface card; and a bus 1108 via which the above components are connected to each other to exchange data. Multiple such computers may be connected to each other via a network.

In the exemplary embodiment embodied by the computer program, among the above exemplary embodiments, the system having the above hardware configuration reads the computer program, which is software, to realize the exemplary embodiment through cooperation of the software and the hardware resources.

The hardware configuration illustrated in FIG. 11 is only an example and the present exemplary embodiment is not limited to the configuration illustrated in FIG. 11 as long as the modules described in the above exemplary embodiments are capable of being executed. For example, part of the modules may be configured by dedicated hardware (for example, an application specific integrated circuit (ASIC)), part of the modules may exist in an external system and the external modules may be connected to the system via the communication line, or multiple systems illustrated in FIG. 11 may be connected to each other via the communication line for collaboration. The system illustrated in FIG. 11 may be incorporated in a home information appliance, a copier, a facsimile, a scanner, a printer, or a multi-function peripheral (an image processing apparatus having two or more of the functions of the scanner, the printer, the copier, the facsimile, and so on), instead of the personal computer.

The programs described above may be stored in a recording medium for provision or the programs may be provided using a communication unit. In this case, the programs described above may be understood as an exemplary embodiment of a "computer-readable recording medium on which the programs are recorded."

The "computer-readable recording medium on which the programs are recorded" means a computer-readable recording medium on which the programs are recorded and which is used for installation, execution, and distribution of the programs.

The recording medium may be a digital versatile disk (DVD), such as a DVD-R, a DVD-RW, or a DVD-RAM conforming to a standard developed in a DVD forum or a DVD+R or a DVD+RW conforming to a standard developed with DVD+RW; a compact disc (CD), such as a CD-ROM, a CD-recordable (CD-R), or a CD-rewritable (CD-RW); a Blue-ray disc (registered trademark); a magneto-optical (MO) disk; a flexible disk (FD); a magnetic tape; a hard disk; a ROM; an electrically erasable and programmable read only memory (EEPROM (registered trademark)); a flash memory; a RAM; or a secure digital (SD) memory card.

The programs described above or part of the programs may be recorded on the recording medium for storage or distribution. Alternatively, the programs described above or part of the programs may be transmitted through communication, for example, using a transmission medium composed of a wired network used for a local area network (LAN), a metropolitan area network (MAN), a wide area network (WAN), the Internet, an intranet, or an extranet; a wireless communication network; or a combination of them. The programs described above or part of the programs may be carried on carrier waves.

Each program described above may be part of another program or may be recorded on the recording medium along with another program. The program described above may be divided to be recorded on multiple recording media. The program described above may be recorded in any recoverable mode, such as in a compressed mode or an encoded mode.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An order processing apparatus for processing an order having a plurality of types of CAD (computer-aided design) information, the order processing apparatus comprising:
a memory configured to store a confidential information delivery matrix in which each order step type of a plurality of order step types is associated with information indicating what types of CAD information can or cannot be transmitted with the respective order step type, the information not to be transmitted and the plurality of order step types being stored in association with each other in the memory, the CAD information being extracted from a CAD drawing; and
a processor configured to:
process a specific step in the order including:
determining, based on the information, from the confidential information delivery matrix in the memory, that indicates what types of CAD information can or cannot be transmitted, which of type of CAD information is not to be transmitted for the order step type of the specific step being processed;
modifying the CAD information by deleting the type of CAD information that is determined not to be transmitted, or by converting the type of CAD information that is determined not to be transmitted into other information; and
transmitting the modified CAD information to an external destination over a computer network, wherein the transmitting allows a user device to access the modified CAD information at the external destination.

2. The information processing apparatus according to claim 1, wherein the processor is further configured to transmit the converted CAD information to multiple external destinations.

3. The information processing apparatus according to claim 1, wherein the information not to be transmitted for the specific step is confidential information.

4. The information processing apparatus according to claim 3, wherein the confidential information does not contain shape data.

5. The information processing apparatus according to claim 3, wherein the confidential information includes at least one of: parameters, arithmetic expressions of the parameters, macros, and work procedures/histories.

6. A non-transitory computer readable medium storing computer program instructions that, when executed by a computer cause the computer to:
process a specific step in an order having a plurality of types of CAD (computer-aided design) information, the processing of the specific step in the order including:
determining, based on information, from a confidential information delivery matrix stored in a memory, that indicates what types of CAD information can or cannot be transmitted, which of type of CAD information is not to be transmitted for the order step type of the specific step being processed, the confidential information delivery matrix associating each order step type of a plurality of order step types with the information that indicates what types of CAD information can or cannot be transmitted with the respective step type, the information indicating the types of CAD information not to be transmitted and the plurality of order step types being stored in association with each other in the memory, the CAD information being extracted from a CAD drawing;
modifying the CAD information by deleting the type of CAD information that is determined not to be transmitted, or by converting the type of CAD information that is determined not to be transmitted into other information; and
transmitting the modified CAD information to an external destination over a computer network, wherein the transmitting allows a user device to access the modified CAD information at the external destination.

7. A method comprising:
processing a specific step in an order having a plurality of types of CAD (computer-aided design) information, the processing of the specific step in the order including:
determining, based on information, from a confidential information delivery matrix stored in a memory, that indicates what types of CAD information can or cannot be transmitted, which of type of CAD information is not to be transmitted for the order step type of the specific step being processed, the confidential information delivery matrix associating each order step type of a plurality of order step types with the information that indicates what types of CAD information can or cannot be transmitted with the respective order step type, the information indicating the types of CAD information not to be transmitted and the plurality of order step types being stored in association with each other in the memory, the CAD information being extracted from a CAD drawing;
modifying the CAD information by deleting the type of CAD information that is determined not to be transmitted, or by converting the CAD information that is determined not to be transmitted into other information; and
transmitting the modified CAD information to an external destination over a computer network, wherein the transmitting allows a user device to access the modified CAD information at the external destination.

8. An order processing apparatus for processing an order according to an ordering process definition, the order having a plurality of types of CAD (computer-aided design) information, the order processing apparatus comprising:
a memory configured to store the ordering process definition, the ordering process definition defining associations between each order step type of a plurality of order step types with information indicating what types of CAD information can or cannot be transmitted with the respective order step type, the information not to be transmitted and the plurality of order step types being stored in association with each other in the memory, the CAD information being extracted from a CAD drawing;
a processor configured to:
process a specific step in the order including:
determining, based on the information, from the confidential information delivery matrix in the memory, that indicates what types of CAD information can or cannot be transmitted, which of type of CAD information is not to be transmitted for the order step type of the specific step being processed;
modifying at least a portion of the CAD information by deleting the type of CAD information that is determined not to be transmitted, or by converting the type of CAD information that is determined not to be transmitted into other information; and
transmitting the modified CAD information to an external destination over a computer network, wherein the transmitting allows a user device to access the modified CAD information at the external destination.

* * * * *